US010320139B2

(12) United States Patent
Martindale

(10) Patent No.: US 10,320,139 B2
(45) Date of Patent: Jun. 11, 2019

(54) CABLE CONNECTOR ATTACHMENT DEVICE

(71) Applicant: David Martindale, Aloha, OR (US)

(72) Inventor: David Martindale, Aloha, OR (US)

( * ) Notice: Subject to any disclaimer, the term of this patent is extended or adjusted under 35 U.S.C. 154(b) by 291 days.

(21) Appl. No.: 15/019,346

(22) Filed: Feb. 9, 2016

(65) Prior Publication Data

US 2016/0261082 A1 Sep. 8, 2016

Related U.S. Application Data

(60) Provisional application No. 62/126,832, filed on Mar. 2, 2015.

(51) Int. Cl.

*B23P 19/00* (2006.01)
*H01R 43/042* (2006.01)
*H01R 9/05* (2006.01)

(52) U.S. Cl.

CPC ............. *H01R 43/042* (2013.01); *H01R 9/05* (2013.01)

(58) Field of Classification Search

CPC .... H01R 43/042; H01R 43/205; H01R 43/26; H01R 9/05; H05K 31/301; H05K 31/306
See application file for complete search history.

(56) References Cited

U.S. PATENT DOCUMENTS

| | | | | | |
|---|---|---|---|---|---|
| 4,932,091 | A * | 6/1990 | Krzyzanski | H01R 43/042 29/758 |
| 5,392,508 | A * | 2/1995 | Holliday | B25B 27/10 29/280 |
| 5,743,131 | A * | 4/1998 | Holliday | B25B 27/10 29/237 |
| 6,591,487 | B2 | 7/2003 | Chang | |
| 8,015,698 | B2 | 9/2011 | Sutter | |
| 8,296,935 | B2 | 10/2012 | Montena | |
| 8,307,544 | B2 | 11/2012 | Natoli | |
| 8,464,422 | B2 * | 6/2013 | Holliday | B21D 39/048 29/751 |
| 2010/0313412 | A1 | 12/2010 | Youtsey | |

* cited by examiner

*Primary Examiner* — Paul D Kim
(74) *Attorney, Agent, or Firm* — Global Intellectual Property Agency, LLC; Daniel Boudwin

(57) ABSTRACT

A tool for securing a cable connector to the free end of a cable is provided. The tool comprises a base with a sliding press member and a cradle. The sliding press member slides along the base and comprises a working end that is adapted to slide towards the cradle, while the cradle supports a cable connector loosely positioned onto the free end of a cable. The working end of the sliding press member engages the cable connector and forces it onto the cable. The sliding press member is controlled by a rotatable lever arm, while the cable and cable connector are held in the cradle by way of a clamp member. The cradle includes a tapering portion that is adapted to compress a portion of the cable connector against the cable when pressed thereover, thereby securing the connector to the cable.

9 Claims, 4 Drawing Sheets

CABLE CONNECTOR ATTACHMENT DEVICE

CROSS REFERENCE TO RELATED APPLICATION

This application claims the benefit of U.S. Provisional Application No. 62/126,832 filed on Mar. 2, 2015. The above identified patent application is herein incorporated by reference in its entirety to provide continuity of disclosure.

BACKGROUND OF THE INVENTION

Field of the Invention

The present invention relates to cable connectors and tools for applying cable connectors to the free ends of cables. More specifically, the present invention relates to a tool for applying and compressing a cable connector to a cable end. In particular, the present invention is well suited for coaxial cables and for securing coaxial connectors thereto.

Connecting runs of cable together or connecting a cable to a junction usually requires a particular cable connector. The connector is secured to the end of the cable, which provides connectivity between the cable and the connector, and ultimately allows the cable to secure to an adjacent cable or junction. One common cable type is a coaxial cable. Coaxial cable comprises an interior conductor surrounded by an insulator and a conducting shield, which together are wrapped in an outer jacket. This type of cable has uses in residential and commercial applications. Coaxial cable is generally used to transmit radio frequency signals, and is a common cable type for transmitting cable television signals, broadband internet, and the like.

Most connectors for coaxial cables are compressed onto the free end of a cable and comprise a fastener. The connector comprises one of a male or female connector, whereby the male connector comprises a center conductor and the female connector comprises a socket for receiving the center conductor of a male connector therein. Common tools for applying a connector to a coaxial cable include handheld compression fitting tools, plyers, and the like. While these tools are useful, the present invention provides a new and improved tool that allows for rapid application of a connector to a cable. In particular, the present invention is a tool that eliminates the need to manually press a connector onto the end of a cable. The tool presses the cable into the cable connector to a proper depth before the connector is compressed. The user can therefore rapidly secure connectors to cable ends using the tool and property seat the cable within the connector before compressing the connector to the cable. This improves efficiency and reduces user fatigue over multiple applications.

In particular, the present invention provides a tool in which the user can press a connector onto the free end of a cable while the user is supporting the cable and connector on a cradle. The tool includes a press member that is slid along the tool base. The press member includes a working end that is adapted to engage a cable connector that is supported within the cradle. The cradle may include a clamp to secure the cable and cable connector within the cradle as the press member presses the connector onto the cable end. Thereafter, the cable and connector are pressed over a tapered portion of the cradle, which compresses the connector to the cable. Therefore, the connector is secured and compressed to the cable end without gripping a tool by hand or supporting multiple components simultaneously. The present invention is ideal for securing multiple connectors in rapid succession. The term cable used herein may include a wire, cable, or equivalent structure that accepts press-on connectors adapted to be compressed thereto.

SUMMARY OF THE INVENTION

The following summary is intended solely for the benefit of the reader and is not intended to be limiting in any way. The present invention provides a new cable connector tool that can be utilized for providing convenience for the user when securing and compressing a cable connector to a cable end.

It is therefore an object of the present invention to provide a new and improved cable connector tool that has all of the advantages of the prior art and none of the disadvantages.

It is another object of the present invention to provide a cable connector tool that comprises a base, a sliding member, and a cradle for securing a cable connector to the free end of a cable. The present invention is suited for various cable connector applications, including use with different cable types and cable connector types. One exemplary example used throughout this disclosure is use of coaxial cable and coaxial cable connector in conjunction with the tool of the present invention. The present invention contemplates uses with many different cable and connector types, with coaxial cables and connectors being but one example that should not be considered limiting.

Another object of the present invention is to provide a cable connector tool that comprises a base having a first end, a second end, a length, and an upper surface. Along the first end of the base is a cradle, while a sliding press member is slidably disposed along a portion of the length of the base.

Another object of the present invention is to provide a cable connector tool in which the cradle is adapted to support a cable and a cable connector to be affixed to an end of the cable thereon.

Another object of the present invention is to provide a cable connector tool in which the sliding press member has a working end that is adapted to engage the connector and press the connector onto the end of the cable while the cable and connector are disposed on the cradle.

Another object of the present invention is to provide a cable connector tool in which the cradle comprises a first end that receives the working end of the sliding press member, and a second end that is opposite of the first end that comprises a tapering surface. The tapering surface of the cradle is used to compress an end of the cable connector as it is pressed thereover by the sliding press member. The cross section of the connector is deformed against the outer surface (jacket) of the cable to retain the connector along the end of the cable.

Another object of the present invention is to provide a cable connector tool in which the cradle has a non-uniform interior cross section. The interior cross section of the cradle second end is smaller in area than the interior cross section of the first end. The tapering surface reduces the open cross section within the cradle along the second end. In this way, the tapered surface of the second end is adapted to compress a portion of the connector against the cable, thus compressing the connector in place against the cable when the connector is pressed over the tapered surface by the working end of the sliding press member.

Another object of the present invention is to provide a cable connector tool that comprises a rotatable lever arm extending from the second end of the base. The lever arm is pivotably connected to the second end of the base and is connected to the sliding press member by an intermediate arm. Upon rotation of the lever arm, the intermediate arm forces the sliding press member along the length of the base in a sliding motion.

Another object of the present invention is to provide a cable connector tool, whereby the sliding press member is slidably disposed within one or more slots along the length of the base.

Another object of the present invention is to provide a cable connector tool that further comprises a clamp member disposed over the cradle, whereby the clamp is movable between a hold and release position against the cradle. In the hold position, the clamp is lowered toward the cradle to clamp the cable within the cradle. In the release position, the clamp is positioned away from the cradle to allow the cable to slide within the cradle.

Another object of the present invention is to provide a cable connector tool, whereby the clamp member is rotatably attached to the base and rotates between the hold position and the release position.

Another object of the present invention is to provide a cable connector tool, whereby the clamp member is rotatably attached to the base and controlled by a second lever arm. The second lever arm is rotatably attached to the base along the length thereof and rotatably attached to an end of the clamp member. Upon downward rotation of the second lever arm, the second lever arm lowers the clamp member towards the hold position. Upon upward rotation of the second lever arm, the second lever arm elevates the clamp member above the cradle and into the release position.

Another object of the present invention is to provide a cable connector tool, whereby the clamp member further comprises a clamp jaw with a concave lower surface that is adapted to receive the cable therein when pressed thereagainst.

Another object of the present invention is to provide a cable connector tool in which the working end of the sliding press member further comprises a substantially hollow, cylindrical tip that is adapted to engage an end of a coaxial cable connector and receive a center conductor of the coaxial cable connector therein.

Another object of the present invention is to provide a cable connector tool in which the cradle comprises an open U-shape with an open upper, and wherein the interior cross section of the cradle is adapted to receive a coaxial cable and coaxial cable connector therein.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
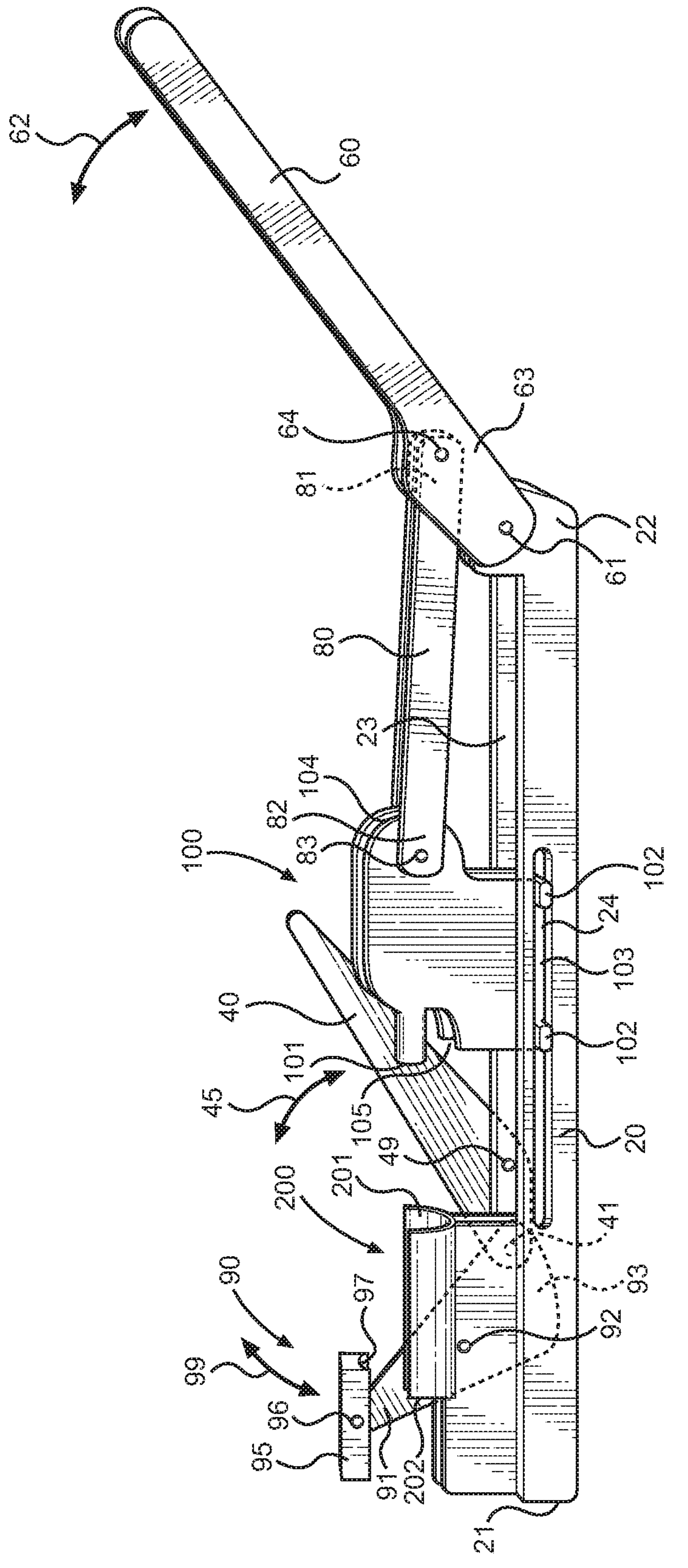
FIG. 1 shows a side view of an embodiment of the cable connector tool of the present invention.

Reference is made herein to the attached drawings. Like reference numerals are used throughout the drawings to depict like or similar elements of the cable connector tool of the present invention. For the purposes of presenting a brief and clear description of the present invention, the preferred embodiment will be discussed as used for securing and compressing a cable connector to the end of a cable. The figures are intended for representative purposes only and should not be considered to be limiting in any respect.

Figure 2:
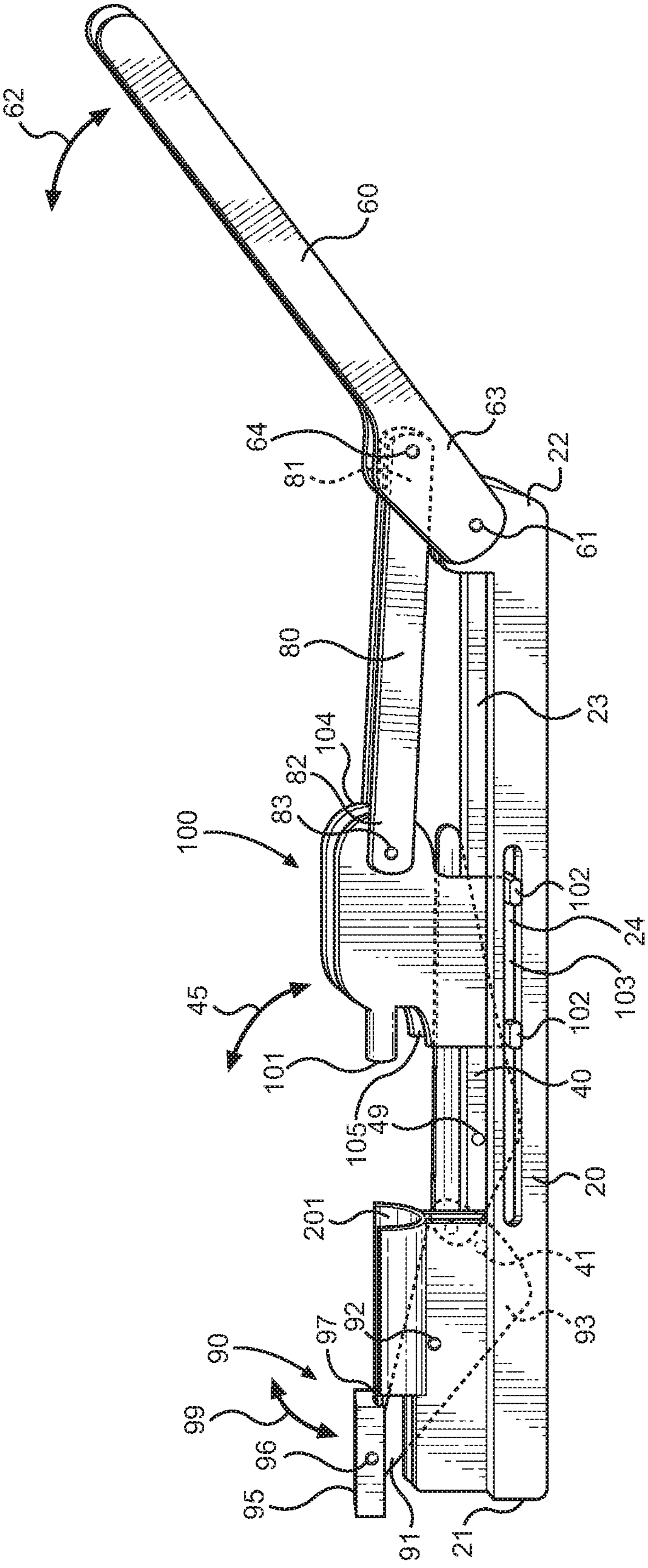
FIG. 2 shows another side view of the cable connector tool, whereby the clamp is lowered over the cradle to support a cable end therein.
Figure 3:
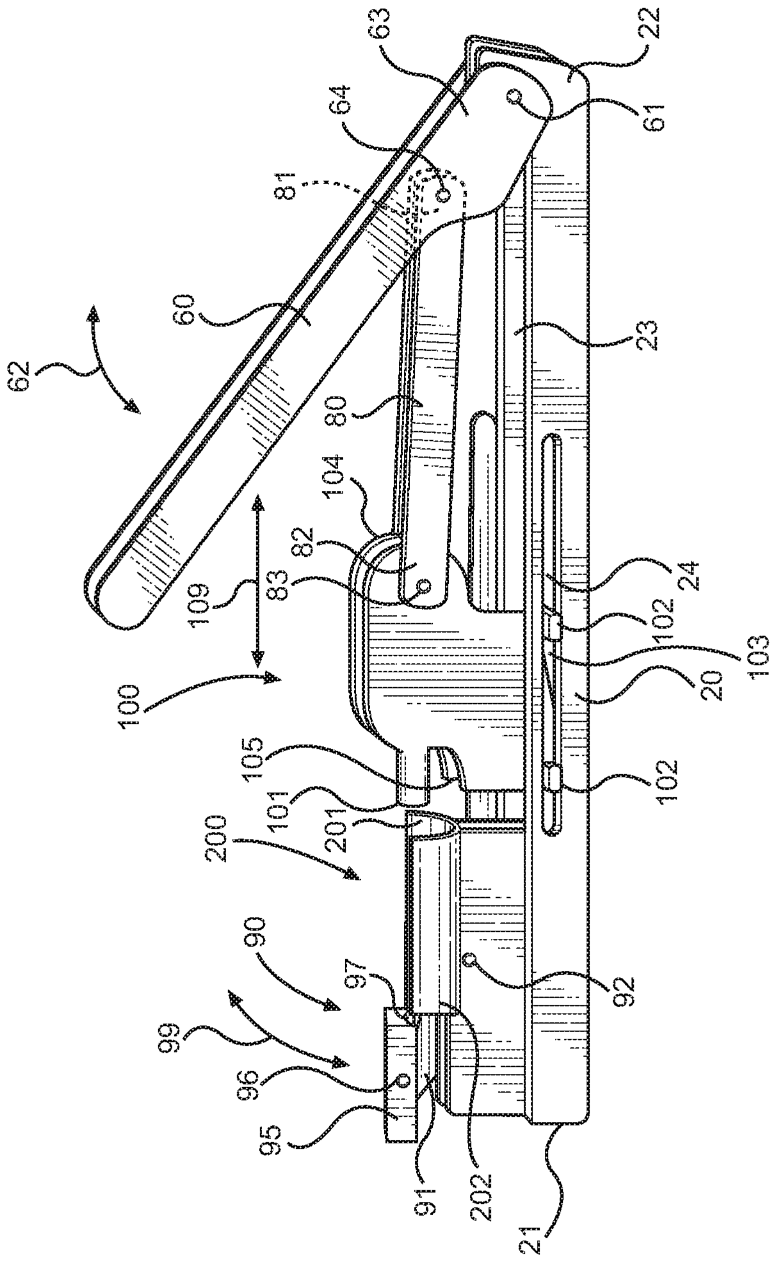
FIG. 3 shows yet another side view of the cable connector tool, whereby the clamp is lowered over the cradle and the lever arm is rotated to advance the sliding press member towards the cradle, and thus towards a cable end and connector supported therein.

Referring now to FIGS. 1-3, there are shown views of the cable connector tool of the present invention in various states. The cable connector tool is one that can be used to rapidly and efficiently secure a cable connector to the free end of a cable. The device comprises a base 20, a sliding press member 100, and a cradle 200. The base 20 is an elongated structure that supports the sliding press member 100 and the cradle 200, and preferably has a flat lower surface such that the tool can be placed onto a flat work surface while in operation. This eliminates any need for the user to manually hold or otherwise support the tool while applying a connector to a cable end.

The sliding press member 100 of the tool works in conjunction with the cradle 200 to apply the cable connector to the cable end. The sliding press member 100 engages the end of the connector and presses the connector onto the cable. The cradle 200 is used to support the cable with the cable connector loosely applied to its end. The cradle 200 is also used to compress the cable connector against the outer jacket (outer surface) of the cable using the sliding action of the sliding press member 100. The operation and mechanics of these two distinct functions (application and compressing of the connector) are described in detail below, along with accompanying drawing views showing the various states of the tool.

The sliding press member 100 comprises a working end 101, or tip, which is adapted to engage one or more types of cable connectors. Because of the variety of connectors in the market, this working end 101 may be suited for a particular connector, or alternatively may be a generic working end 101 that functions with several connector types. Further still, the working end 101 of the sliding press member 100 may be removable from the body of the sliding press member 100, thereby allowing the user to secure a specific tip or working end 101 necessary to engage a particular connector.

Cable connectors have a distal end that is adapted to secure to a junction or another connector, as well as a proximal end that is adapted to receive a particular cable therein. The proximal end of the cable connector is generally open and receives the free end of the cable therein. Thereafter, the proximal end is compressed against the outer surface of the cable to prevent the cable connector from separating from the cable. The tool of the present invention uses the sliding press member 100 to engage the distal end of the connector, and thereafter press against the distal end of the connector to translate it or force it against the free end of the cable, which is disposed within the proximal end of the connector. This pressing motion forces the connector over the cable and the cable into the connector. This is necessary to ensure proper connectivity across the cable end and connector. Once applied, the cable connector is compressed against the outer surface of the cable. This compressing operation is a plastic deformation of the cross section of the connector, which is deformed towards the cable to prevent separation of the cable from the connector after the two are pressed together. The tool of the present invention first applies the connector, and then compresses the connector to the cable.

The sliding press member 100 comprises a body portion with a working end 101 that is directed towards the cradle 200. The lower end 103 of the member body is disposed within a channel 23 in the base, whereby the lower end 103 includes tabs 102 that engage slots 24 along the sidewalls of the base 20. The channel 23 and the slots 24 allow the press member 100 to freely slide, or translate along the length of the base 20. The extent of sliding motion allowed is determined by the slot 24 length, and the lever arm 60 that actuates the press member 100.

The working end 101 of the sliding press member 100 extends outward from a first end 105 of the member. This extended working end 101 allows the working end 101 to enter the cradle interior and thus engage a connector therein. The working end must engage the connector, and thereafter force the connector across the surface of the cradle 200 to compress the same. To accomplish this, the cradle 200 has a first end 201 and a second end 202, whereby the working end 101 of the sliding press member 100 enters the open cross section of the first end 201. The connector and cable end are supported within the open cross section of the cradle 200, where the cable is held in position to apply the connector, and thereafter released when compressing the connector to allow the connector and cable to slide within the cradle interior by action of the press member.

While the cable is held in a static position by the user, the working end 101 of the press member 100 presses the connector onto the held cable, thereby seating the cable completely within the connector proximal end. Once seated, the user releases the cable and forces the press member 100 further towards the cradle 200. The second end 202 of the cradle 200 includes a tapering surface, which reduces its open cross section. The press member 100 forces the connector over this tapering surface, which deforms the connector cross section against the cable. Therefore, the press member 100 is first used to seat the connector, and thereafter used to compress the connector. The user's input on the cable determines which action is conducted (i.e., connector application or connector compressing).

In one embodiment, the sliding press member 100 has a rear portion 104 that connectors to an intermediate arm 80. The intermediate arm 80 is hingedly affixed to the rear 104 of the press member 100 by a pin joint 83. The intermediate arm 80 includes a first end 83 affixed to the pin joint 83, and a second end 81 affixed to the lever arm 60. The second end 81 is similarly hinged to the lever arm 60 at a pin join 64. Finally, the lever arm 60 is hingedly or pivotably affixed to the second end 22 of the base 20 at a pin join 61. In this way, the lever arm 60 is rotatable 62 about the base 20, and is used to drive the intermediate arm 80, which in turn translates the sliding press member 100 along the length of the base 200 and within the channel 23 thereof. The second end 81 of the intermediate arm 80 connects to the lever 60 along its length and above the pin join connection 61, between the lever arm 60 and the base 20. The lever arm has a retracted position and an extended position. When the lever arm 60 is rotated into its fully extended position, the working end 101 of the press member 100 is disposed within the interior of the cradle 200. When retracted, the sliding press member 100 is withdrawn from the cradle 200.

To assist with handling the cable on the cradle 200, there is provided a clamp member 90 disposed over the cradle 200. The clamp member 90 is movable 99 between a hold and release position, whereby the in the hold position, the clamp 90 is lowered toward the cradle 200 to secure a cable within the cradle 200 interior. In the release position, the clamp 90 is disposed away from the cradle 200 to allow a cable to slide into the cradle interior. In one embodiment, the clamp member comprises a clamp jaw 95 with a concave lower surface 97 that is adapted to receive the cable therein and be pressed thereagainst. The concave lower surface 97 bears against an upper surface of a cable, while the cradle 200 bears against a lower surface of the cable. This clamps the cable within the cradle 200 and prevents movement thereof as the connector is applied to the cable end.

In one embodiment, the clamp jaw 95 moves between its hold and release positions using a second lever arm 40. The second lever arm 40 may affix directly to the clamp jaw 95, whereby downward motion of the second lever arm 40 lowers the clamp jaw 95. In this embodiment, one end of the second lever arm 40 is rotatably affixed to the base 20, and an opposite end is rotatably affixed to the clamp jaw 95 at a pin join 96. Alternatively, and as shown in FIGS. 1-3, the clamp jaw 95 is rotatably affixed to a clamp linkage 91, which extends between the clamp jaw 95 and the second lever arm. In this embodiment, the one end of the second lever arm is rotatably connected to the lower end 93 of the linkage 91 at a pin join 41. The second lever arm is also pinned 49 to the base 20, whereby the upper end of the second lever arm 40 can be pressed downward 45 to cause a rotation of the linkage 91. This causes the clamp jaw 95 to lower onto the cradle, or lower downward such that the clamp jaw 95 is disposed adjacent to the second end 202 of the cradle 200. In this embodiment, downward rotation 45 of the second lever arm 40 lowers the clamp member 90 towards the hold position, and upward rotation 45 of the second lever arm 40 elevates the clamp member 90 above the cradle 200 and into the release position.

Referring to FIGS. 1-3, there are shown several states of the tool. In FIG. 1, the tool is in its resting state, in which the lever arm 60 and the sliding press member 100 are positioned away from cradle 200, and the clamp member 90 is positioned above the cradle 200. In this state, the user can place the cable and connector in the cradle 200. Thereafter, and as shown in FIG. 2, the user can clamp the cable in place within the cradle 200 using the clamp member 90. The clamp member 90 is rotated downward 90 using the second lever arm 40. This secures the cable within the cradle 200. Alternatively, the user can hold the cable in place if a clamp member 90 is not provided. Next, the user advances 109 the sliding press member 100 forward using the lever arm 60, moving the press member 100 towards the first end 201 of the cradle 200, as shown in FIG. 3. The cable connector distal end is facing the sliding press member 100, while its distal end has received the cable loosely therein. The working end 101 of the press member 100 engages the distal end of the connector, and presses the connector onto the cable end as the lever arm 60 is rotated and the sliding press member 100 translates towards the cradle.

Once the connector is fully engaged by the cable, the connector is set to be compressed onto the outer surface of the cable to prevent separation. The clamp member 90 is released (or the user releases his or her grasp on the cable), thus allowing the cable and connector to freely slide within the interior of the cradle 200. The working end 101 of the sliding press member 100 maintains its engagement with the distal end of the connector, and the lever arm 60 is further advanced. This causes the connector and cable to slide within the cradle, from the first end 201 to the second end 202. The connector proximal end is forced over the tapered surface of the second end 202, thereby causing the connector to deform at its proximal end. This deformation compresses the connector against the outer surface of the cable. Once compressed, the user can retract the lever arm 60 and remove the connected cable end and connector from the tool. The cable and connector are thereafter affixed to one another and the tool can be reset to its resting state.

Figure 5:
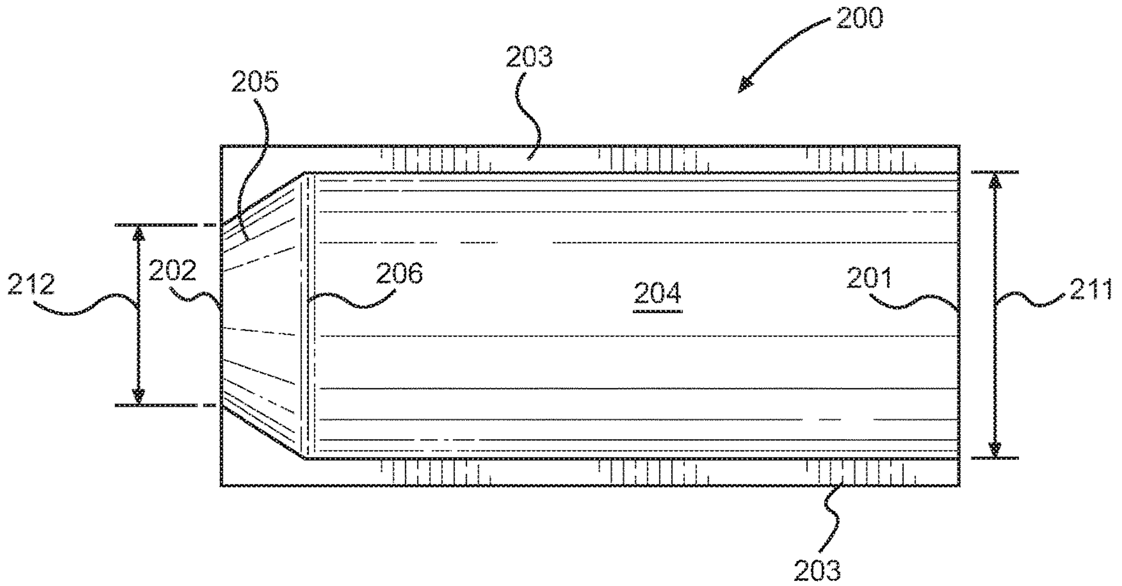
FIG. 5 shows an overhead view of the cradle and the tapering surface thereof.

Referring to FIG. 5, there is shown an overhead view of an embodiment of the cradle 200. The cradle has a first end 201 and a second end 202. The cradle further has a sidewall surface 203 that forms a substantial U-shape, or enclosed, tubular shape (not shown). The cradle 200 further comprises a length extending between the first end 201 and the second end 202. Along the length, the cradle 200 has an interior cross section bounded by the interior surface 204 of the cradle. The interior cross section receives a cable and a connector therein. Along the first end 201, the cross section has a first cross sectional area 211. Along the second end 202, the cross section has a second cross sectional area 212. The second cross sectional area 212 is smaller than the first cross sectional 211, whereby the second end 202 of the cradle 200 comprises a tapering surface 205 that reduces the second cross sectional area 212 moving from the first end to the second end. This tapered surface 205 initiates 206 along the length of the cradle 200, and is adapted to compress a portion of a cable connector proximal end against the cable outer surface. This compresses the connector in place thereagainst when the connector is forced over the tapered surface 205 by the working end of the sliding press member. This action is a cold works the connector and deforms its proximal end cross section, compressing the connector against the cable. The cradle 200 may comprise an open upper (i.e., an open U-shape). Alternatively, the cradle 200 may be enclosed (i.e., tubular), whereby the upper is not open.

Figure 4:
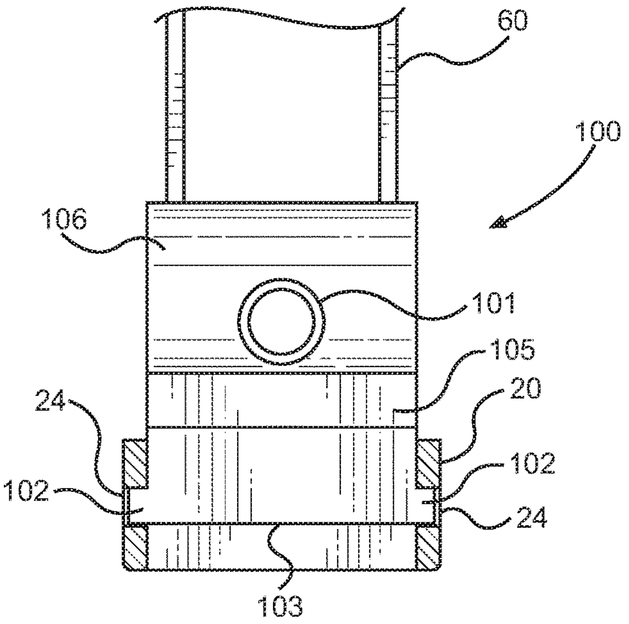
FIG. 4 shows an end view of an embodiment of the working end of the sliding press member.

Referring now to FIG. 4, there is shown an end view of the sliding press member 100. The sliding press member 100 comprises a body portion with a first end 105 and a rear end. The first end 105 includes an extended working end 101, or tip, which extends from the surface 106 of the first end 105. Along the lower end 103 of the sliding press member 100, the body portion includes a pair of outwardly extended tabs 102. The tabs 102 engage the slots 24 along the sidewalls of the tool base 20. The tabs 102 slide therein and allow the press member to translate along the length of the base. This configuration is but one configuration contemplated that allows the sliding press member 100 to translate along a length of the base. Alternative configurations are contemplated, including those that include bearing elements or alternate structures to facilitate sliding motion when the sliding press member 60 is pressed by the lever arm 60.

In one embodiment, the working end 101 the of the sliding press member 100 further comprises a substantially hollow 109, cylindrical tip that is adapted to engage a distal end of a coaxial cable connector and receive a center conductor of the coaxial cable connector therein. The working end 101 is substantially rounded and tubular, whereby the interior 109 is hollow to receive the center conductor of a coaxial cable connector. The outer end of the working end is preferably flat, and presses on the interior of the connector to force the connector onto the end of a coaxial cable.

Overall, the present invention provides a new and novel tool for applying a connector to the end of a cable. The tool uses a sliding member and a cradle, and does not require the user to support the tool while supporting the cable and connector. This improves efficiency and eliminates any gripping motion for compression connectors.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cable connector attachment and compression fitting tool, comprising:

a base with a first end, a second end, a length, and an upper surface;

a sliding press member slidably disposed along a portion of the length of the base;

a cradle disposed along the first end of the base, the cradle adapted to support a cable and a connector to be affixed to an end of the cable thereon;

the sliding press member having a working end adapted to engage the connector and press the connector onto the end of the cable while the cable and connector are disposed on the cradle;

the cradle comprising a first end that receives the working end of the sliding press member;

the cradle further comprising a second end that is opposite of the first end, whereby the second end comprises a tapering surface;

whereby the cradle has an interior cross section;

the interior cross section of the second end being smaller than the interior cross section of the first end; and whereby the tapered surface of the second end is adapted to compress a portion of the connector against the cable to compress the connector in place thereon when pressed over the tapered surface by the working end of the sliding press member.

2. The cable connector application and compression fitting tool of claim 1, further comprising:

a rotatable lever arm extending from the second end of the base, the lever arm being pivotably connected to the second end of the base;

the lever arm being connected to the sliding press member by an intermediate arm; and whereby rotation of the lever arm translates into sliding motion of the sliding press member along the length of the base.

3. The cable connector application and compression fitting tool of claim 1, wherein the sliding press member is slidably disposed within one or more slots along the length of the base.

4. The cable connector application and compression fitting tool of claim 1, further comprising:

a clamp member disposed over the cradle, whereby the clamp member is movable between a hold and release position;

whereby in the hold position, the clamp member is lowered toward the cradle to clamp the cable within the cradle; and whereby in the release position, the clamp is disposed away from the cradle to allow the cable to slide within the cradle.

5. The cable connector application and compression fitting tool of claim 4, wherein the clamp member is rotatably attached to the base and rotates between the hold position and the release position.

6. The cable connector application and compression fitting tool of claim 4, wherein:

the clamp member is rotatably attached to the base and rotates between the hold position and the release position;

where a second lever arm is rotatably attached to the base along the length thereof and rotatably attached to an end of the clamp member;

whereby downward rotation of the second lever arm lowers the clamp member towards the hold position; and whereby upward rotation of the second lever arm elevates the clamp member above the cradle and into the release position.

7. The cable connector application and compression fitting tool of claim 4, wherein:

the clamp member further comprises a clamp jaw with a concave lower surface that is adapted to receive the cable therein.

8. The cable connector application and compression fitting tool of claim 1, wherein:

the working end further comprises a substantially hollow, cylindrical tip that is adapted to engage an end of a coaxial cable connector and receive a center conductor of the coaxial cable connector therein.

9. The cable connector application and compression fitting tool of claim 1, wherein:

the cradle comprises an open U-shape with an open upper; and wherein the interior cross section of the cradle is adapted to receive a coaxial cable and coaxial cable connector therein.

* * * * *